United States Patent
Kanzaki et al.

(10) Patent No.: US 6,820,152 B2
(45) Date of Patent: Nov. 16, 2004

(54) MEMORY CONTROL DEVICE AND LSI

(75) Inventors: Hideyuki Kanzaki, Takarazuka (JP); Masataka Osaka, Osaka (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 442 days.

(21) Appl. No.: 10/120,327

(22) Filed: Apr. 10, 2002

(65) Prior Publication Data

US 2002/0161956 A1 Oct. 31, 2002

(30) Foreign Application Priority Data

Apr. 25, 2001 (JP) ........................................ 2001-127502

(51) Int. Cl.⁷ ............................................... G06F 13/38
(52) U.S. Cl. ................................................... 710/244
(58) Field of Search .................. 710/113–125, 240–244

(56) References Cited

U.S. PATENT DOCUMENTS

| | | | |
|---|---|---|---|
| 4,096,571 A | * 6/1978 | Vander Mey | 711/151 |
| 4,232,366 A | * 11/1980 | Levy et al. | 710/121 |
| 5,099,420 A | * 3/1992 | Barlow et al. | 710/119 |
| 5,195,089 A | * 3/1993 | Sindhu et al. | 370/235 |
| 5,257,356 A | * 10/1993 | Brockmann et al. | 710/110 |
| 5,630,163 A | * 5/1997 | Fung et al. | 710/307 |
| 5,740,380 A | * 4/1998 | LaBerge et al. | 710/107 |
| 5,745,708 A | * 4/1998 | Weppler et al. | 710/119 |
| 5,752,266 A | 5/1998 | Miyawaki et al. | |
| 5,764,929 A | * 6/1998 | Kelley et al. | 710/107 |
| 5,784,569 A | 7/1998 | Miller et al. | |
| 6,055,577 A | * 4/2000 | Lee et al. | 709/233 |
| 6,138,200 A | 10/2000 | Ogilvie | |
| 6,178,475 B1 | * 1/2001 | O'Brien | 710/116 |
| 6,199,132 B1 | * 3/2001 | Hewitt et al. | 710/107 |
| 6,301,604 B1 | * 10/2001 | Nojima | 718/108 |
| 6,363,445 B1 | * 3/2002 | Jeddeloh | 710/113 |
| 6,385,678 B2 | * 5/2002 | Jacobs et al. | 710/113 |
| 6,418,502 B1 | * 7/2002 | Larson | 710/306 |
| 6,425,032 B1 | * 7/2002 | Prasanna | 710/117 |
| 6,532,507 B1 | * 3/2003 | Falik et al. | 710/107 |

FOREIGN PATENT DOCUMENTS

| | | | | |
|---|---|---|---|---|
| EP | 0 675 445 A2 | 10/1995 | | |
| EP | 1253518 A1 | * 10/2002 | ......... | G06F/13/362 |
| JP | 8314793 | 11/1996 | | |

* cited by examiner

Primary Examiner—Paul R. Myers

(57) ABSTRACT

A memory control device for arbitrating memory access contention among bus masters while ensuring, regarding each bus master, the required transfer rate within the required time margin. A device external to LSI 100 writes into the transfer rate information storage unit 111 the transfer rate information indicating the transfer rate and the time period within which the transfer rate is to be ensured. In response, the timing information generator unit 112 determines the shortest time period as a cycle, and also determines, regarding each bus master, time taken to ensure the required transfer rate based on the memory bus bandwidth as a bus use permission time period. The arbiter unit 114 grants the bus use right sequentially with the passage of time to each bus master issuing a bus request for the corresponding bus use permission time period.

19 Claims, 11 Drawing Sheets

FIG.2

Transfer Rate Information 300

| Bus Master 301 | Request Cycle (μs) 302 | Data Amount per Transfer (KB) 303 |
|---|---|---|
| A | 2000 | 1000 |
| B | 1000 | 100 |
| C | 4000 | 400 |

FIG.3

400 Timing Information

| | |
|---|---|
| Request Detection Cycle (μs) | 1000 |
| In-Cycle Bus Use Permission Time Period (μs) A | 625 |
| B | 125 |
| C | 125 |

401
402

MEMORY CONTROL DEVICE AND LSI

BACKGROUND OF THE INVENTION (1) Field of the Invention

The present invention relates to a memory control device for controlling memory access, and especially to a memory control device installed in an LSI (Large Scale Integrated Circuit) for controlling access from a plurality of circuits within the LSI to an external memory connected to the LSI.

(2) Description of the Related Art

In recent years, multimedia information has become increasing common. Against this background along with other factors, developments of LSIs including one or more DSPs (Digital Signal Processors) and MPUs (Micro processing Units) have been proceeding.

Further, developments of complex, high-performance LSIs that include, along with MPUs, independent circuits such as AV (Audio Visual) decoders and hard disk controllers have been proceeding.

Circuits included inside such complex LSIs are independent circuits capable of performing arithmetic operations and other operations to carry out their respective functions using independent local memories. Here, by constructing an LSI such that those circuits share the same memory to perform arithmetic operations and other operations to carry out their respective functions, reduction of the component costs and other effects are realized.

To meet this end, it is required that a memory control device be provided inside an LSI in order to arbitrate contention for access to the shared memory among the circuits.

Memory control devices arbitrate access requests from a plurality of circuits such as DSPs and MPUs (hereinafter referred to as "bus masters"), i.e., bus requests for the usage of a memory bus, so as to permit only one bus master at a time to access the shared memory. That is to say, the memory control device grants a right for the usage of the memory bus to only one bus master at a time.

On the other hand, each bus master issues a bus request to the memory control device when wanting to access the memory, and performs data transfer to or from the memory using the memory bus upon being granted the bus use right.

When there is data to be processed continually in order to, for example, replay image and/or sound in real time, some bus masters are required to transfer the data at a fixed transfer rate.

Such a bus master that is required to transfer data at a fixed transfer rate has an inherent request for time intervals within which the transfer rate is to be maintained. The time intervals are determined depending on the size of input-output buffer included, the type of data processing employed, and other factors. For example, some bus masters are required that the transfer rate of 500 kilo-bytes per millisecond (KB/ms) be maintained with respect to every 2 milliseconds (ms). Some other bus masters are required that the transfer rate of 500 KB/ms be maintained with respect to every 1 ms, which allows a shorter time margin for ensuring the transfer rate.

Provided that the memory is exclusively used, a bus master basically issues a bus request repeatedly at the time intervals within which the transfer rate should be maintained. Hereinafter, such time intervals within which the transfer rate should be maintained are referred to as bus request cycles.

In order to design an LSI which includes: a plurality of bus masters requiring data transfer at a fixed transfer rate; and a memory control device, it is necessary to construct an arbiter mechanism in the memory control device in consideration of a transfer rate and a bus request cycle that are required for each bus master.

Under appropriate arbitration, each bus master is allowed to transfer data at a requested transfer rate. However, in the case where arbitration is inappropriate, there may be a problem that one or more of the bus masters fail to transfer data at their requested transfer rates within their bus request cycles.

Conventional memory control devices typically include an arbiter mechanism employing a priority scheme in which priority is given on a first-come first-served basis, or a priority scheme in which each bus master is arbitrated in accordance with their assigned priorities.

Hereinafter, description is given to problems associated with such conventional memory control devices.

Here, consideration is given to the case where the bandwidth of a memory bus is about 800 KB/ms and an LSI includes two bus masters A and B. When there is data to be processed continually, the bus A is required to transfer 1000 KB of data within a bus request cycle of 2 ms, while the bus master B is required to transfer 100 KB of data within a bus request cycle of 1 ms, which allows only half the time margin comparing to the bus request cycle of the bus master A. Further, it is assumed that a first-come first-served basis priority scheme is employed and that the bus master A issues a bus request first. Alternatively, it is assumed that arbitration is carried out based on their priorities and that the bus master A has a higher priority.

In both cases, when the bus master A issues a bus request to a conventional memory control device, the memory control device grants a bus use right to the bus master A to permit data transfer. In response, the bus master A transfers 1000 KB of data, which takes 1 ms or longer. As a result, the memory control device is unable to immediately respond to a bus request from the bus master B which is issued every 1 ms.

Under the circumstances, the bus master B has to put up with the latency time longer than 1 ms to access memory. Consequently, the bus master B fails to uniformly transfer 100 KB of data to or from the memory in each cycle of 1 ms, which results in inconsistent data transfer. In other words, the transfer rate required for the bus master B is not maintained within each bus request cycle.

As described above, the conventional memory control device having an arbitrating mechanism based on a first-come first-served basis or an assigned priority basis may manage to ensure the transfer rate required for each bus master on a long-term basis. However, such a conventional memory control device is incapable of ensuring the transfer rates on a short-term basis, which is a problem.

To address the above problem, a memory control device needs to be designed with consideration given in advance to the transfer rate required for each bus maser and the time intervals within which the transfer rate needs to be ensured.

However, a process that each bus master is required to perform differs depending on a device into which an LSI is incorporated. Consequently, the transfer rate and bus request cycle required for each bus master differ. Under these circumstances, it is extremely difficult to design a memory control device with consideration given in advance to specific processes that each bus master is later required to perform.

Further, LSIs have been improved year after year. In view of cost reduction incurred for future development of incorporating a new circuit into LSIs, there is a demand for developing and designing a versatile memory control device capable of ensuring data transfer rates of whatever circuits incorporated into the LSI. Such a versatile memory control device will realizes the use of the designing resources over a long period of time.

SUMMARY OF THE INVENTION

The present invention is made in view of such demand as above, and aims to provide a versatile memory control device that arbitrates contention for memory access while ensuring the transfer rate required for each bus master within the time periods required for each bus master. The present invention also aims to provide an LSI including such a memory control device and bus masters.

To achieve the above objects, a memory control device of the present invention is for arbitrating memory access contention among a plurality of bus masters sharing a memory by selectively granting a bus use right that permits the usage of a memory bus to one of the plurality of bus masters at a time, and the memory control device comprises: holding means for holding transfer rate information regarding each of the plurality of the bus masters, the transfer rate information indicating (i) a transfer rate at which a corresponding bus master performs data transfer to or from the memory, and (ii) an ensuring time period within which data transfer at the transfer rate is to be ensured; reference period calculating means for determining, as a reference time period, a time period equal to or shorter than a shortest ensuring time period among all the ensuring time periods; bus use permission time period calculating means for calculating bus use permission time periods, each of which is a time period that a bus master takes to transfer an amount of data V using a bus bandwidth of the memory bus, wherein V represents an amount of data that a corresponding bus master is capable of transferring at a corresponding transfer rate within the reference time period; and use right granting means for granting the bus use right to each bus master for a corresponding bus use permission time period within each reference time period that repeats cyclically. Alternatively, a memory control device of the present invention is for arbitrating memory access contention among a plurality of bus masters accessing separate memory areas within a memory by selectively granting a bus use right that permits the usage of a memory bus to one of the plurality of bus masters at a time, and the memory control device comprises: holding means for holding transfer rate information regarding each of the plurality of the bus masters, the transfer rate information indicating (i) a transfer rate at which a corresponding bus master performs data transfer to or from the memory, and (ii) an ensuring time period within which data transfer at the transfer rate is to be ensured; reference period calculating means for determining, as a reference time period, a time period equal to or shorter than a shortest ensuring time period among all the ensuring time periods; bus use permission time period calculating means for calculating bus use permission time periods, each of which is a time period that a bus master takes to transfer an amount of data V using a bus bandwidth of the memory bus, wherein V represents an amount of data that a corresponding bus master is capable of transferring at a corresponding transfer rate within the reference time period; and use right granting means for granting the bus use right to each bus master for a corresponding bus use permission time period within each reference time period that repeats cyclically.

With these constructions, even if there are no uniform conditions regarding the transfer rate that are required for each bus master, the transfer rate is adjusted in a manner to satisfy the transfer rate conditions associated with a bus master having the smallest time margin allowed for transfer latency. As a result, each of the bus masters is allowed to perform data transfer at the required transfer rate maintained within the required time margin.

Further, with this memory control device, even when conditions regarding the transfer rate of each bus master need to be changed, what is required is merely renewing the stored transfer rate information, and then each bus maser performs data transfer to or from the memory at the newly required transfer rate. This means that the memory control device is usable irrespective of possible replacement of a bus, which is a subject of memory access contention control.

Here, the memory control device may comprise detecting means for detecting a bus request from each bus master, wherein the use right granting means grants the bus use right for a current reference time period to each bus master of which a bus request has been detected by the detecting means prior to a start of the current reference time period.

With this construction, each bus maser that shares the memory is allowed to be granted the bus use right and consequently to perform data transfer at the required transfer rate through issuing a bus request when wanting to transfer data. Note that circuits constructing the memory control device may be simplified in their constructions comparing to those constructing a memory control device that employs a scheme to detect a bus request and grant the bus use right within the same reference interval upon detecting a bus request issued from the bus master.

Further, the bus masters may be classified into (i) regular type bus masters, each of which is required to perform data transfer to or from the memory at a fixed transfer rate, and (ii) irregular type bus masters, which are bus masters other than the regular type bus masters, the holding means may hold the transfer rate information regarding each regular type bus master, the bus use permission time period calculating means may calculate the bus use permission time periods for each regular type bus master, and the use right granting means may grant the bus use right for each reference time period (i) to each regular type bus master of which a bus request has been detected prior to a start of the current reference time period, the bus use right being granted for a corresponding bus use permission time period, and (ii) to each irregular type bus master for, at the maximum, a time period remaining after subtracting from the reference time period a total amount of the bus use permission time periods calculated for each of the regular type bus masters of which bus requests have been detected With this construction, even in the case where there are two types of bus masters (1) a regular type bus master which is required to transfer data at a fixed transfer rate and (2) an irregular type bus master which is a bus master other than the regular type sharing the memory, the regular type bus master is allowed to perform data transfer at the required transfer rate at the required time intervals.

Further, the use right granting means may grant the bus use right for each reference time period to an irregular type bus master immediately after terminating the bus use right granted to a regular type bus master when the detecting means detects a bus request from the irregular type bus master during the time the bus use right is being granted to the regular type bus master.

With this construction, an irregular type bus master is allowed to perform data transfer immediately after the need for data transfer arises.

Further, the holding means may acquire the transfer rate information from a source external to the memory control device, and hold the acquired transfer rate information.

With this construction, even in the case where the transfer rate needs to be changed due to, for example, function changes of each bus master, appropriate transfer rate information is given from an external source. As a result, contention for memory access among bus masters is appropriately arbitrated.

Further, the holding means may hold the transfer rate information within the memory control device in a memory area that is rewritable by an external device.

With this construction, even in the case where each bus master's transfer rate or other conditions need to be changed, the transfer rate information is rewritten from an external source whenever necessary. As a result, contention for memory access between bus masters is appropriately arbitrated.

Further, the memory control device may be connected to each bus master through a signal line used for granting the bus use right, and the use right granting means may grant the bus use right to each bus master by putting a signal line connected to the bus master into an active state for a corresponding bus use permission time period.

With this construction, the bus use right is granted for a limited time period using a single signal line.

Further, the reference time period calculating means may determine, as the reference time period, the shortest ensuring time period among all the ensuring time periods.

With this construction, a bus master having a shortest time margin allowed for transfer latency is used as the reference, so that the transfer rate required for each bus master is adjusted relatively easily.

Further, an LSI consistent with the present invention includes (i) a plurality of circuits that share a memory and (ii) a memory control device for arbitrating memory access contention by selectively granting a bus use right that permits the usage a memory bus to one of the plurality of circuits at a time, each circuit is required to perform data transfer to or from the memory at a fixed transfer rate, and the memory control device comprises: holding means for holding transfer rate information regarding each of the plurality of the circuits, the transfer rate information indicating (i) a transfer rate at which a corresponding circuit performs data transfer to or from the memory, and (ii) an ensuring time period within which data transfer at the transfer rate is to be ensured; reference period calculating means for determining, as a reference time period, a time period equal to or shorter than a shortest ensuring time period among all the ensuring time periods; bus use permission time period calculating means for calculating bus use permission time periods, each of which is a time period that a circuit takes to transfer an amount of data V using a bus bandwidth of the memory bus, wherein V represents an amount of data that a corresponding circuit is capable of transferring at a corresponding transfer rate within the reference time period; and use right granting means for granting the bus use right to each circuit for a corresponding bus use permission time period within each reference time period that repeats cyclically.

With this construction, a plurality of internal circuits included in the LSI are allowed to perform data transfer to or from the memory that is shared with each other at the required transfer rate maintained within the required time margin.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 is a view showing the data structure and an example of content of transfer rate information given from an external device and stored in the transfer rate information storage unit 111;

FIG. 3 is a view showing the data structure and an example of content of timing information generated by the timing information generator unit 112 and stored in the timing information storage unit 113;

DESCRIPTION OF THE PREFERRED EMBODIMENT

Hereinafter, description is given to an LSI including a plurality of bus masters and a memory control device that is consistent with preferred embodiments of the present invention.

<Embodiment 1>

<Construction>

Figure 1:
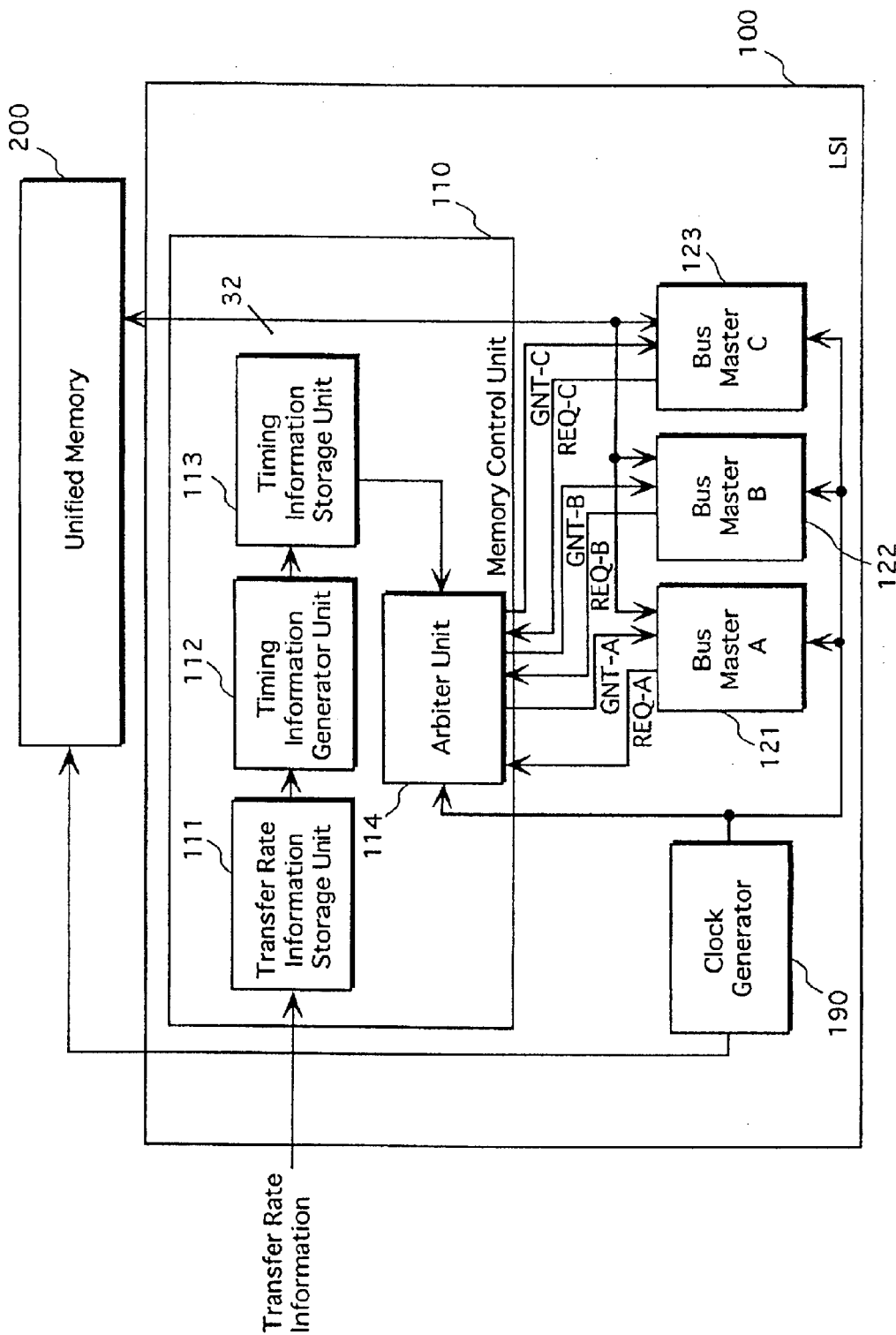
FIG. 1 is a block diagram of the LSI 100 including a memory control device consistent with the embodiment 1 of the present invention.

FIG. 1 is a view showing the construction of an LSI 100 including a memory control device consistent with an embodiment 1 of the present invention. Note that along with the LSI 100, a unified memory 200 is shown in FIG. 1.

The LSI 100 is an LSI to be incorporated into home information appliances or other devices, and includes a memory control unit 110, a bus master A 121, a bus master B 122, a bus master C 123 and a clock generator 190. The LSI 100 is connected to the unified memory 200 as well as to other external devices, although such external devices are not shown in FIG. 1.

Here, the clock generator 190 is a circuit providing clock signals to the memory control unit 110, the bus masters A–C, and the unified memory 200.

The bus masters A 121, B 122, and C 123 are, for example, MPUs that use the unified memory 200 as main storage, or DSPs for storing data such as image data in the unified memory 200, and independently access the unified memory 200 to perform data transfer. That is, when wanting to perform data transfer, each of the bus masters A–C separately issues a bus request to the memory control unit 110 through a corresponding REQ signal line, and acquires a bus use right from the memory control unit 110 through a corresponding GNT signal line. Within the period of time that the bus use right is being granted, the bus master performs data transfer in synchronism with the arbiter unit 114 included in the memory control unit 110 based on the timing provided by clock signals from the clock generator 190.

In FIG. 1, bus requests from the bus masters are denoted as REQ-A, REQ-B, and REQ-C, respectively, while grant of the bus use rights to the bus masters are denoted as GNT-A, GNT-B, and GNT-C, respectively.

Note that data transfer is performed through (1) memory addressing and (2) data writing to or data reading from the unified memory, which results in that the address and the data is transferred over the memory bus. Data that each bus master transfers to or from the unified memory 200 may be image data that the bus master has generated based on data inputted from an external device and that is to be outputted to a display device.

Each bus master performs data transfer independently, and is required to transfer data to or from the unified memory at a fixed transfer rate so that, for example, image is outputted to a display device without interruption. It should be noted, however, the bus masters may not always perform data transfer to or from the unified memory continually. For example, during the time that an external device continually inputs data to a bus master and consequently that data to be sent is generated and accumulated within the bus master, the bus master continually performs data transfer to the unified memory. On the other hand, during the time that no data to be transferred is accumulated, the bus master does not perform data transfer to the unified memory.

Further, the memory control unit 110 arbitrates access from the bus masters to the unified memory 200 based on transfer rate information given from an external device, and includes a transfer rate information storage unit 111, a timing information generator unit 112, a timing information storage unit 113, and an arbiter unit 114.

Here, the transfer rate information storage unit 111 is a memory area for storing the transfer rate information given from the external device. Note that the transfer rate information will be described later in detail.

The timing information generator unit 112 has a function of generating timing information with reference to the transfer rate information stored in the transfer rate information storage unit 111, and storing the thus generated timing information in the timing information storage unit 113. Note that the timing information will be described later in detail.

The timing information storage unit 113 is a memory area for storing the timing information.

The arbiter unit 114 has a function of making reference to the timing information stored in the timing information storage unit 113, checking at a predetermined timing provided by clock signals from the clock generator 190 whether there is a bus request issued from any of the bus masters, and granting the bus use right sequentially and selectively to the bus masters issuing a bus request. Each bus master issues a bus request to the arbiter unit 114 by putting the REQ signal line into an active state, while the arbiter unit 114 grants the bus use right to one of the bus masters by putting a corresponding GNT signal line into an active state. Note that each bus master keeps the REQ signal line in an active state as long as data transfer needs to be performed.

<Data>

FIG. 2 is a view showing the data structure and an example of content of transfer rate information given from an external device and then stored in the transfer rate information storage unit 111.

As shown in the figure, transfer rate information 300 is information composed of pairs of information items, which are a request cycle 302 and a data amount 303 per transfer, regarding each of the bus masters A–C. The transfer rate information is set before each bus master in the LSI starts processing which involving access to the unified memory 200 and consequent data transfer by, for example, an external device that is disposed externally of the LSI, has memory and CPU, and controls the LSI 100.

Here, the request cycle 302 is a time interval within which the transfer rate required for each bus master is to be maintained when there is data to be processed continually. Note that when there is data to be processed continually, each bus master basically issues a bus request in a corresponding request cycle 302 or a shorter cycle.

Further, the data amount 303 per transfer is an amount of data that each bus master needs to transfer within a corresponding request cycle 302.

The example shown in the figure indicates that, when there is data to be transferred continually, the bus master A needs to transfer 1000 kilo-bites (KB) of data per 2000 microseconds ($\mu$s), the bus master B needs to transfer 100 KB of data per 1000 $\mu$s, and the bus master C needs to transfer 400 KB of data per 4000 $\mu$s.

In other words, the transfer rate information 300 in the figure indicates the following. The bus master A is required to perform data transfer at the transfer rate of 500 KB/ms within the time period of 2000 $\mu$s, the bus master B is required to perform data transfer at the transfer rate of 100 KB/ms within the time period of 1000 $\mu$s, and the bus master C is required to perform data transfer at the transfer rate of 100 KB/ms within the time period of 4000 $\mu$s. With respect to the bus masters A–C, the bus master B has the smallest time margin that is allowed for ensuring the transfer rate, and the bus master C has the largest time margin that is allowed for ensuring the transfer rate.

Note that the external device including a CPU and the like is allowed to input to the memory control unit 110 the transfer rate information 300 depending on the specifications of each bus master. As such, the memory control unit 110 is constructed to allow external input of the transfer rate information 300 that determines what controls to be executed. This construction provides the memory control unit 110 with versatility.

FIG. 3 is a view showing the data structure and an example of content of the timing information generated by the timing information generator unit 112 and stored in the timing information storage unit 113.

As shown in the figure, timing information 400 is composed of a request detection cycle 401 and an in-cycle bus use permission time period 402 for each bus master.

Here, the request detection cycle 401 is information indicating a time period that the timing information generator unit 112 determines as an interval for the arbiter unit 114 to detect a bus request from the bus masters A–C.

Further, the in-cycle bus use permission time period 402 is information indicating a time period during which each bus master is to be allowed to use the memory bus in order to perform data transfer required within the request detection cycle 401, i.e., a time period during which the bus use right is to be granted. Note that the unified memory 200 in this embodiment has the memory bus of which bandwidth is 800 KB/ms.

Note that each time period in the timing information is actually represented, for example, by the count of clock signals that the clock generator 190 generates.

<Operations>

Now, description is given to operations of the memory control unit 110 having the above construction.

Figure 4:
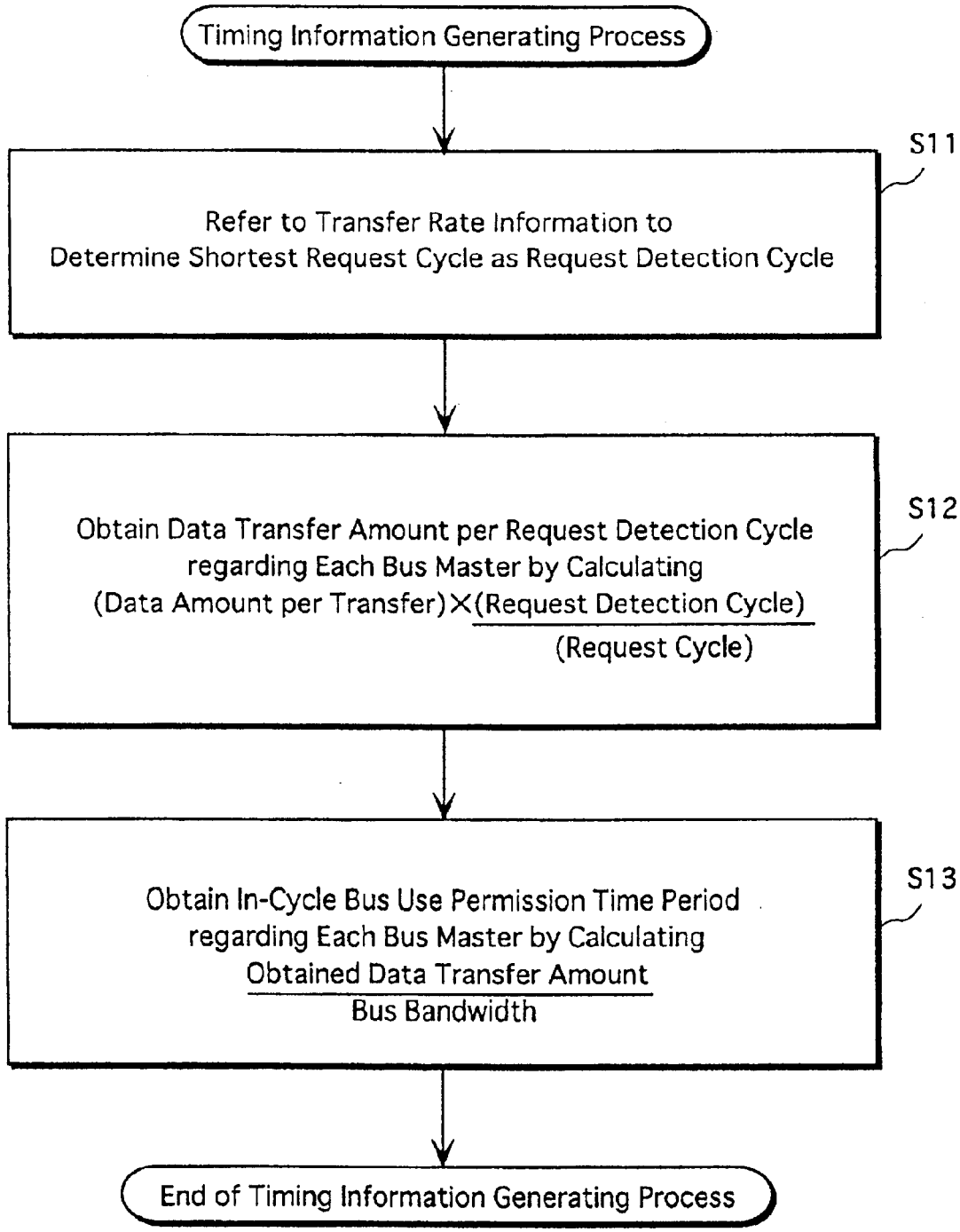
FIG. 4 is a flowchart showing operations of the timing information generator unit 112.

In the condition where the transfer rate information storage unit 111 stores transfer rate information that is given from an external device, the timing information generator unit 112 performs operations shown in FIG. 4.

FIG. 4 is a flowchart showing operations of the timing information generator unit 112.

With reference to the request cycles of each bus master that the transfer rate information indicates, the timing information generator unit 112 determines the shortest request cycle as the request detection cycle to be included in the timing information (step S11).

Then, using the transfer rate information and the request detection cycle determined in the step S11, the timing information generator unit 112 obtains, regarding each bus maser, a data transfer amount that each bus master transfers within each request detection cycle (step S12). The timing information generator unit 112 then divides the thus obtained data transfer amount by the bus bandwidth of the memory bus thereby to obtain, regarding each bus maser, the in-cycle bus use permission time period to be included in the timing information (step S13). Note that the timing information generator unit 112 stores data regarding the bandwidth of the memory bus, for example, in internal memory of the LSI, and carries out the arithmetic operations in the step S13 using the stored bandwidth data.

The timing information generator unit 112 stores the timing information obtained in the above manner into the timing information storage unit 113. It is assumed that such operations of the timing information generator unit 112 are performed within a relatively short period of time after supply of electrical current to LSI is started.

Note that when, for example, the timing information generator unit 112 generates timing information based on the transfer rate information 300 shown as an example in FIG. 2, the resulting timing information is as shown in FIG. 3.

Next, description is given to an arbitrating process that the arbiter unit 114 performs after the timing information has been generated.

Figure 5:
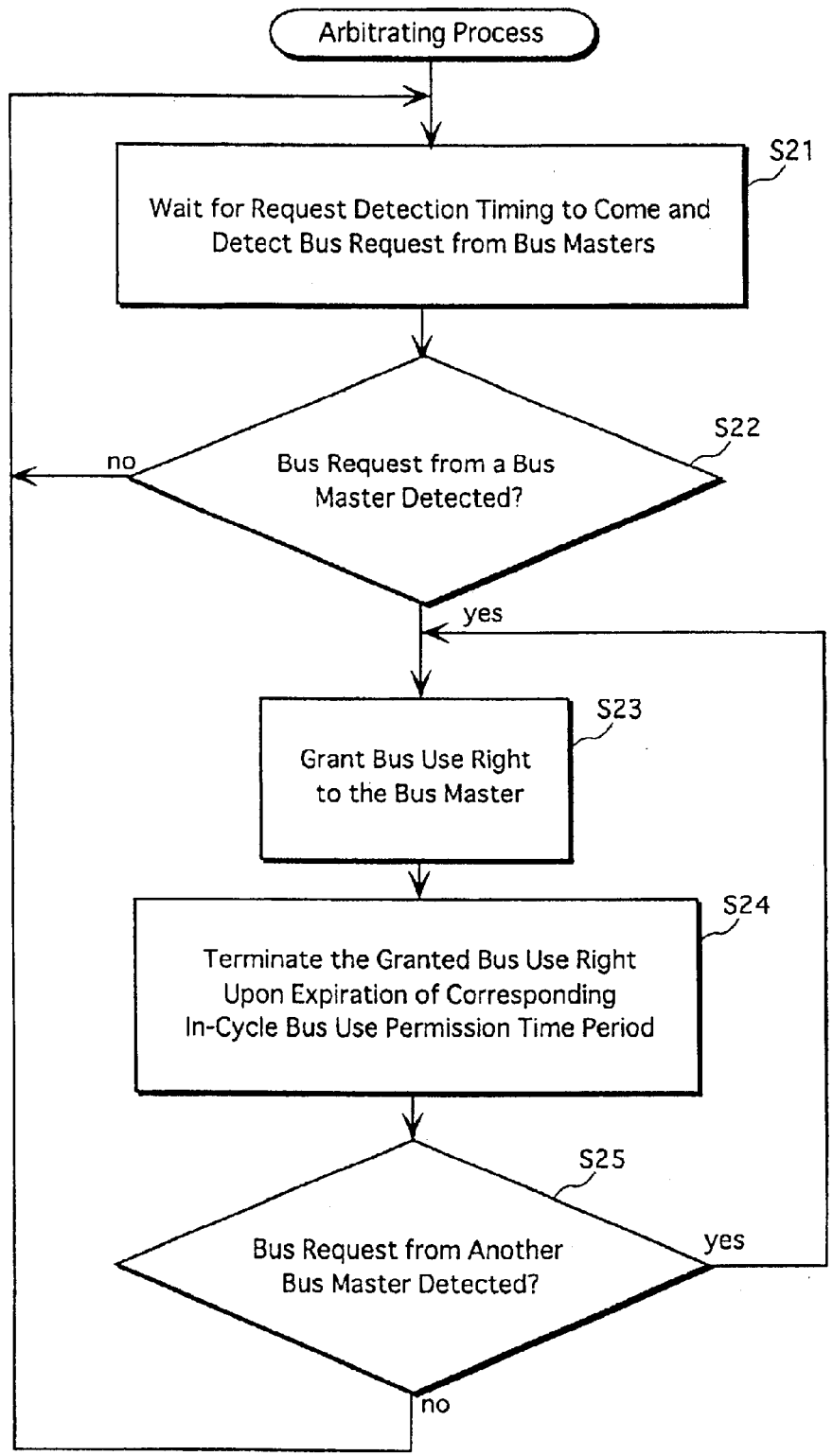
FIG. 5 is a flowchart showing the arbitrating process that the arbiter unit 114 performs.

FIG. 5 is a flowchart showing the arbitrating process that the arbiter unit 114 performs.

With reference to the timing information as well as to clock signals provided by the clock generator 190 at fixed time intervals, the arbiter unit 114 waits for the timing that comes every request detection cycle (hereinafter, the timing is referred to as "request detection timing"). When the request detection timing comes, the arbiter unit 114 checks whether there is a bus request issued from any of the bus masters (step S21).

The arbiter unit 114 judges whether a bus request from any of the bus masters has been detected at the time of checking in the step S21 (step S22). When no bus request from any of the bus masters is detected, the arbiter unit 114 goes back to the step S21 and waits for the next request detection timing to come.

When the judgment in the step S22 results in that a bus request has been detected, the arbiter unit 114 grants the bus use right to one of the bus masters that issued a bus request (step S23).

After granting the bus use right to the bus master, the arbiter unit 114 counts clock signals in order to terminate the granted bus use right upon expiration of the in-cycle bus use permission time period corresponding to that bus maser (step S24). That is, in the steps S23 and S24, the GNT signal line of one of the bus masters is put into an active state for the duration of a corresponding in-cycle bus use permission time period, and then put back into an inactive state.

Following the step S24, the arbiter unit 114 judges whether there is detected in the most recently performed step S21 another bus request from a bus master other than the one that has been already granted the bus use right (step S25). When no such request is detected, the arbiter unit 114 goes back to the step S21 and waits for next request detection timing to come.

The judgment in the step S25 results in that there is detected another bus request from a bus master other than the one that has been already granted the bus use right, the arbiter unit 114 goes back to the process of the step S23.

Consequently, when the lapse of time is expressed as a series of request detection cycles, the arbiter unit 114 grants the bus use right, within each request detection cycle, to each bus master that issued a bus request prior to the current request detection cycle for the duration of a corresponding in-cycle bus use permission time period.

Figure 6:
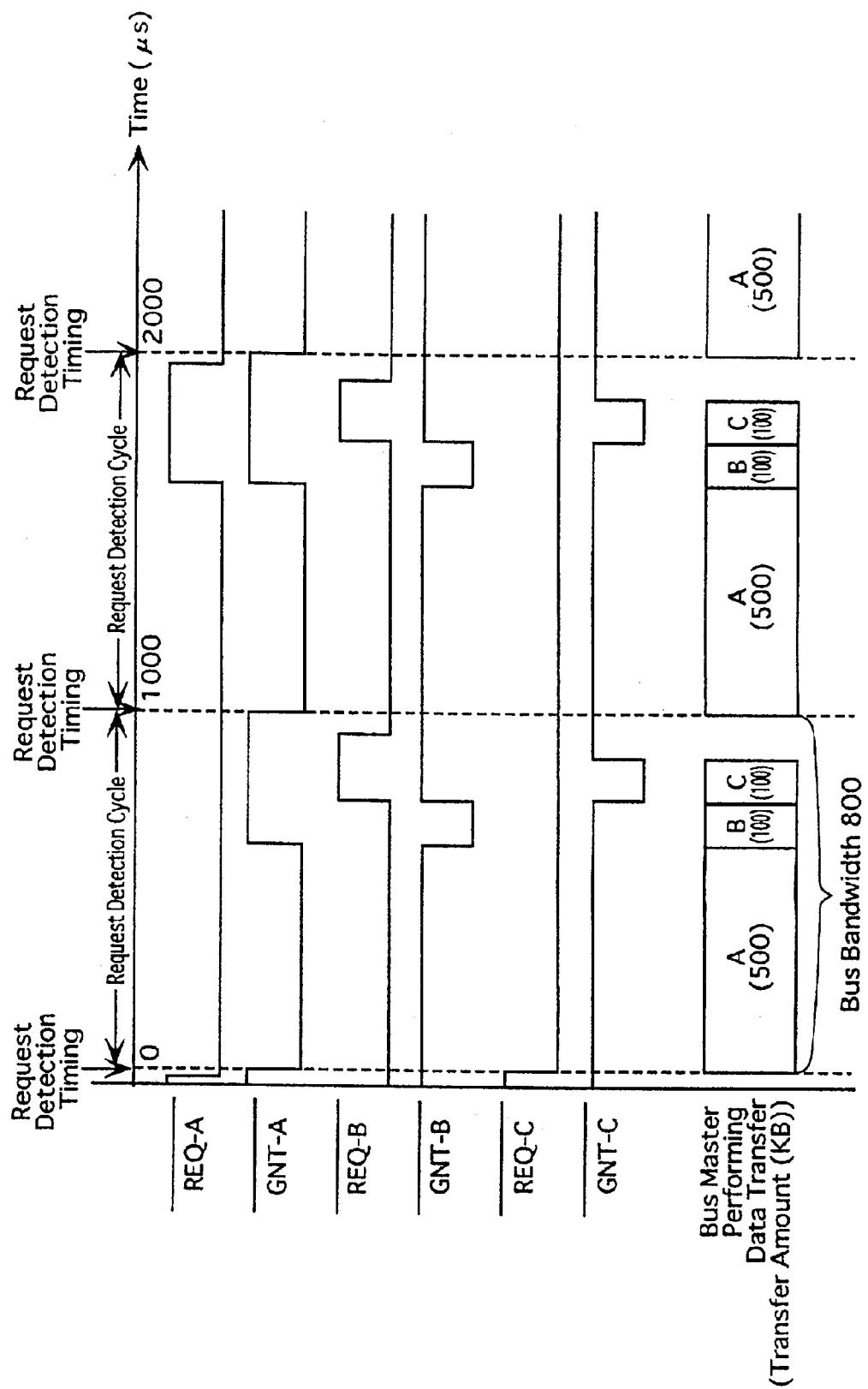
FIG. 6 is a timing chart showing changes with time in bus requests issued from the bus masters A–C, and the bus use right granted by the memory control unit 110.

FIG. 6 is a timing chart showing changes with time in bus requests issued from the bus masters A–C, and the bus use right granted by the memory control unit 110.

The timing chart shows a result that the memory control unit 110 arbitrates contention among the bus masters for memory access based on the transfer rate information 300 shown as an example in FIG. 2.

As apparent from the figure, the request detection cycle is set to be 1000 $\mu$s so as to conform the bus master B that has the shortest request detection cycle, and the bus use right is sequentially granted to the bus masters A, B, and C for the time duration of 625 $\mu$s, 125 $\mu$s, and 125 $\mu$s, respectively. Since the bandwidth of the memory bus is 800 KB/ms, the bus master A, the bus master B, and the bus master C transfer 500 KB, 100 KB, and 100 KB of data, respectively within one request detection cycle.

Accordingly, the bus master A transfers 1000 KB of data in a time period of 2000 ms, the bus master B transfer 100 KB of data in a time period of 1000 ms, and the bus master C transfer 400 KB of data in a time period of 4000 ms. This means that each bus master successfully transfer data at their required transfer rates within their required time margins.

<Embodiment 2>

Hereinafter, description is given to a memory control device consistent with a preferred embodiment 2 of the present invention. The memory control unit 110 described in the embodiment 1 has a function of arbitrating contention for memory access among the bus masters A–C each of which is required to perform data transfer to or from the memory at a fixed rate. A memory control device consistent with the embodiment 2 has a function of arbitrating contention for memory access among the bus masters A–D. Note that the bus master D is not required to perform the transfer rate at the fixed transfer rate and thus performs data transfer irregularly.

<Construction>

Figure 7:
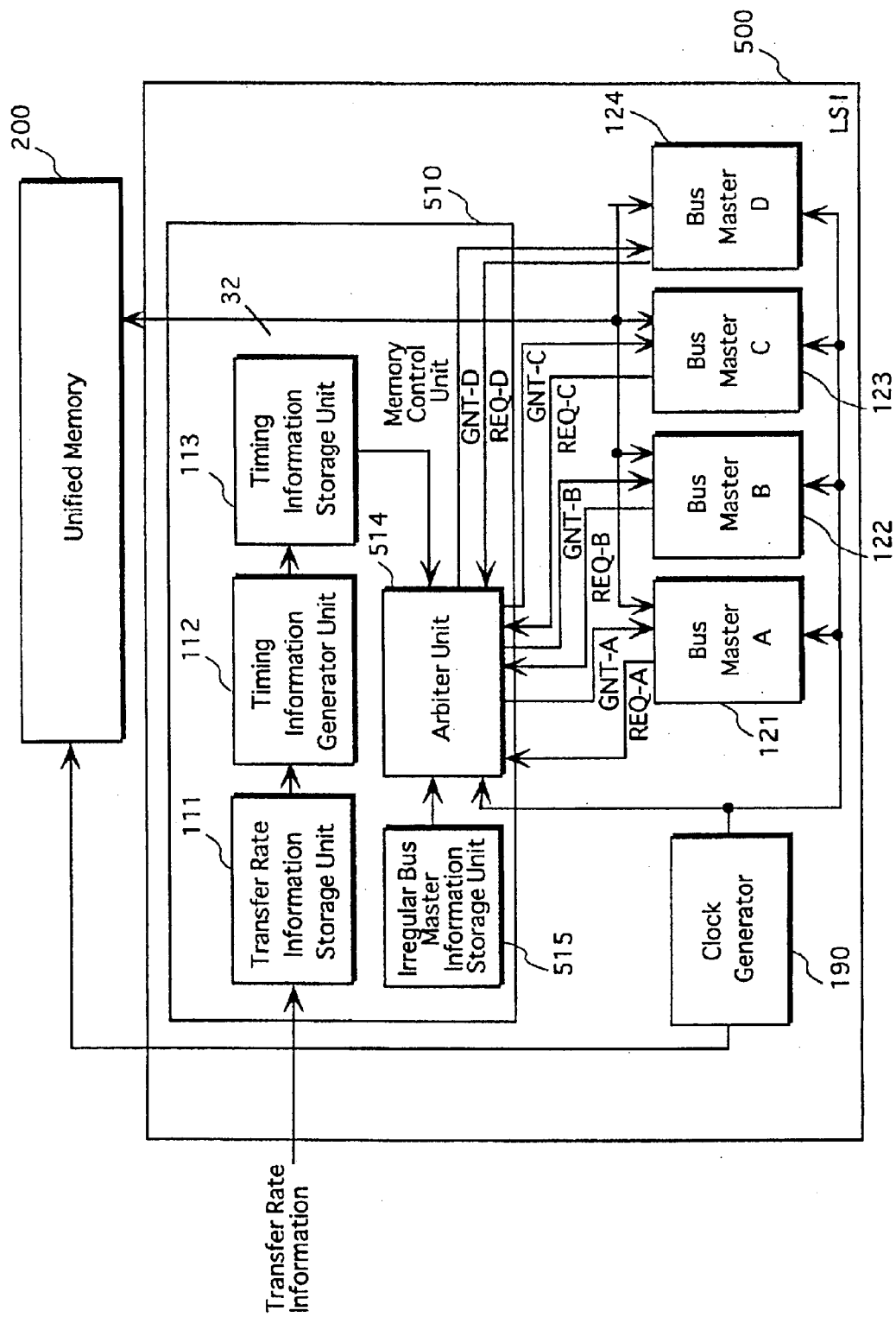
FIG. 7 is a view showing the construction of the LSI 500 including a memory control device consistent with the embodiment 2 of the present invention.

FIG. 7 is a view showing the construction of an LSI 500 including a memory control device consistent with the embodiment 2 of the present invention. Note that along with the LSI 500, the unified memory 200 is also shown in FIG. 7.

The LSI 500 includes a memory control unit 510, the bus master A 121, the bus master B 122, the bus master C 123, the bus master D 124, and the clock generator 190. The LSI 500 is connected to the unified memory 200 as well as to other external devices, although such external devices are not shown in FIG. 7.

Note that among components constructing the LSI 500, the components that are basically identical to those constructing the LSI 100 described in the embodiment 1 are denoted in FIG. 7 by the same reference numerals as in FIG. 1, and the detailed description thereof is omitted here.

Here, the clock generator 190 is a circuit providing clock signals to the memory control unit 510, the bus masters A–D, and the unified memory 200.

The bus master D 124 accesses the unified memory 200 to perform data transfer independently of the bus masters A–C. That is, the bus master D issues a bus request to the memory control unit 510 when wanting to perform data transfer, and obtains the bus use right from the memory control unit 510. Within the period of time that the bus use right is being granted, the bus master D performs data transfer in synchronism with an arbiter unit 514 included in the memory control unit 510 based on the timing provided by clock signals from the clock generator 190.

Note that unlike the bus masters A–C which is required to perform data transfer at the fixed transfer rate, i.e., which issues a bus request regularly (this type of bus masters are hereinafter referred to as "regular type"), the bus master D is of a type which issues a bus request irregularly (this type of bus masters are hereinafter referred to as "irregular type"). Examples of irregular type bus masters include MPUs that perform processing when receiving an external interrupt that occurs in response to a user input made to an LSI-installed device.

In FIG. 7, bus requests from the bus masters are denoted as REQ-A, REQ-B, REQ-C, and REQ-D, respectively, while grant of the bus use rights to the bus masters are denoted as GNT-A, GNT-B, GNT-C, and GNT-D, respectively.

Further, the memory control unit 510 arbitrates access from the bus masters A–D to the unified memory 200 based on the transfer rate information given from an external device, and includes the transfer rate information storage unit 111, the timing information generator unit 112, the timing information storage unit 113, the arbiter unit 514, and an irregular master information storage unit 515.

The irregular master information storage unit 515 is a memory area which preliminarily stores irregular master information indicating the irregular type bus master. The irregular master information is necessary information for the arbiter unit 514 to recognize which of the bus masters is of the irregular type.

With reference to the irregular master information stored in the irregular master information storage unit 515 and the timing information stored in the timing information storage unit 113, the arbiter unit 514 checks whether there is a bus request from any of the bus masters other than the irregular type bus master, i.e., from any of the regular type bus masters A–C, at a predetermined timing provided by clock signals from the clock generator 190. The arbiter unit 514 then sequentially and selectively grants the bus use right to the bus masters issuing a bus request. When there is a time period remaining within the current request detection cycle in which no bus use right is granted to any of the regular type bus masters A–C, the arbiter unit 514 grants the bus use right to the irregular type bus master D as long as the irregular type bus master D is issuing a bus request.

<Operations>

Next, description is given to operations of the memory control unit 510 having the above construction.

The timing information generator unit 112 performs the similar operations to the operations described in the embodiment 1 (See FIG. 4).

Figure 8:
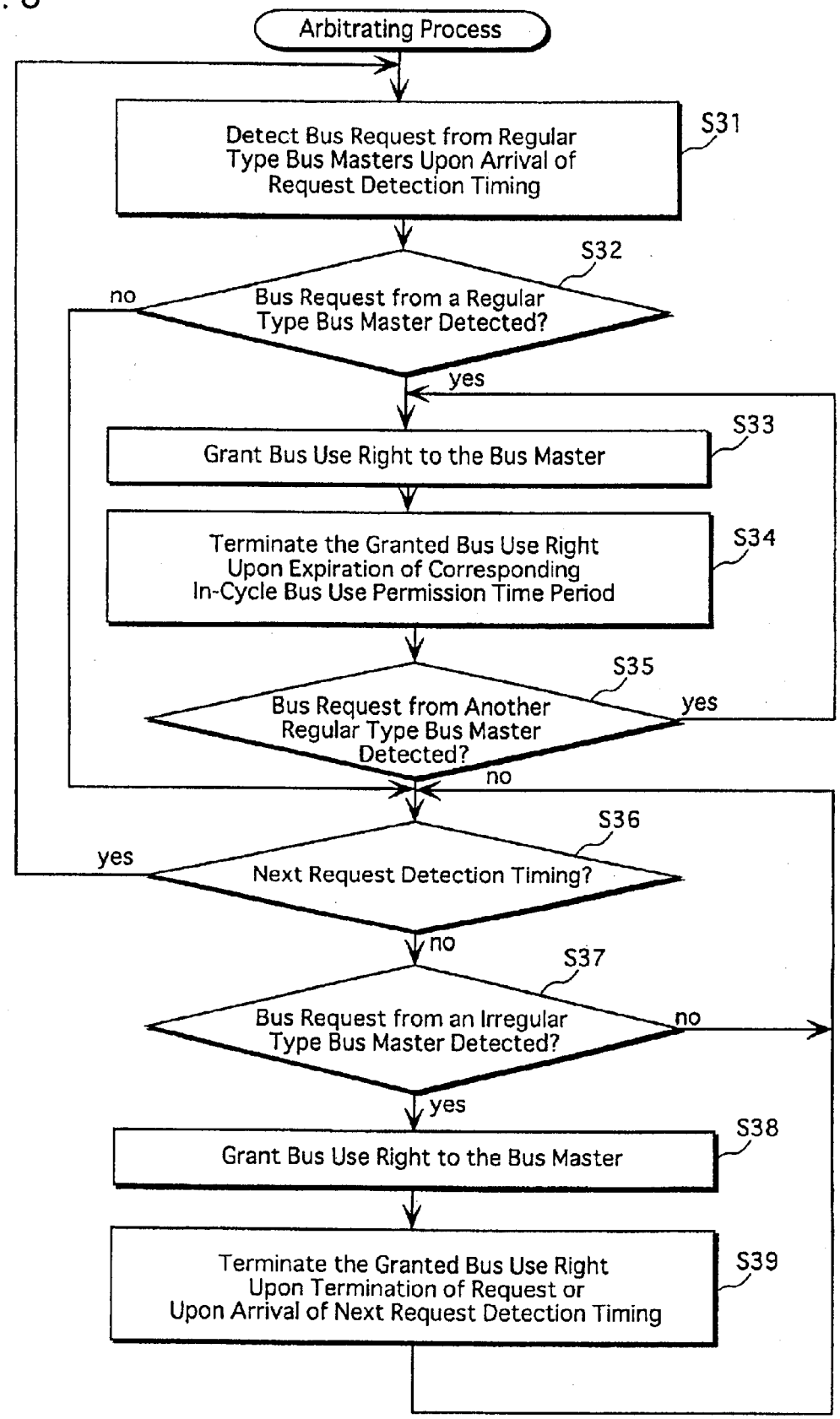
FIG. 8 is a flowchart showing the arbitrating process that the arbiter unit 514 performs.

FIG. 8 is a flowchart showing the arbitrating process that the arbiter unit 514 performs.

With reference to the timing information and clock signals provided at time fixed intervals from the clock generator 190, the arbiter unit 514 waits for the request detection timing to come. When the request detection timing comes, the arbiter unit 514 checks whether there is a bus request issued from any of the bus masters other than irregular type bus master, i.e., any of the regular type bus masters (step S31).

The arbiter unit 514 judges whether there is detected at the time of checking in the step S31 a bus request from any of the regular type bus masters (step S32).

When the judgment in the step S32 results in that a bus request has been detected, the arbiter unit 514 grants the bus use right to one of the regular type bus masters that issued a bus request (step S33). The arbiter unit 514 then counts clock signals in order to terminate the granted bus use right upon expiration of the in-cycle bus use permission time period corresponding to that the bus master (step S34). That is, in the steps S33 and S34, the GNT signal line of one of the regular type bus masters is put into an active state for the duration of a corresponding in-cycle bus use permission time period, and then put back into an inactive state.

Following the step S34, the arbiter unit 514 judges whether there has been detected in the step S31 another bus request from a regular type bus master other than the one that has been granted the bus use right (step S35).

When the judgment in the step S32 results in that there has been detected another bus request from a regular type bus master other than the one that has been granted the bus use right, the arbiter unit 514 goes back to the process in the step S33. Otherwise, the arbiter unit 514 judges whether the next request detection timing has come (step S36). When judging that the next request detection timing has come, the arbiter unit 514 performs the process in the step S31.

Further, when no bus request from any of the bus masters has been detected in the step S32, the arbiter unit 514 skips the process in the steps S33–S35, and performs the judgment process in the step S36.

In the step S36, when judging that the next request detection timing has not come yet, the arbiter unit 514 checks whether there is a bus request issued from the irregular type bus master D (step S37). When such a bus request is detected, the arbiter unit 514 grants the bus use right to the irregular type bus master D (step S38), and terminates the granted bus use right at the time when the bus request from the irregular type bus master is terminated or when the next request detection timing has come (step S39), and then goes back to the judgment process in the step S36.

Note that when no bus request from the irregular type bus master has been detected in the step S37, the arbiter unit 514 also goes back to the judgment process in the step S36.

Consequently, when the lapse of time is expressed as a series of request detection cycles, the arbiter unit 514 first grants the bus use right, within each request detection cycle, to each of the regular type bus masters that issued a bus request one cycle before the current request detection cycle for the duration of corresponding in-cycle bus use permission time period. Next, the arbiter unit 514 grants the bus use right, within the time period remaining in each request detection cycle, to the irregular type bus master D provided that the bus master D issued a bus request.

Figure 9:
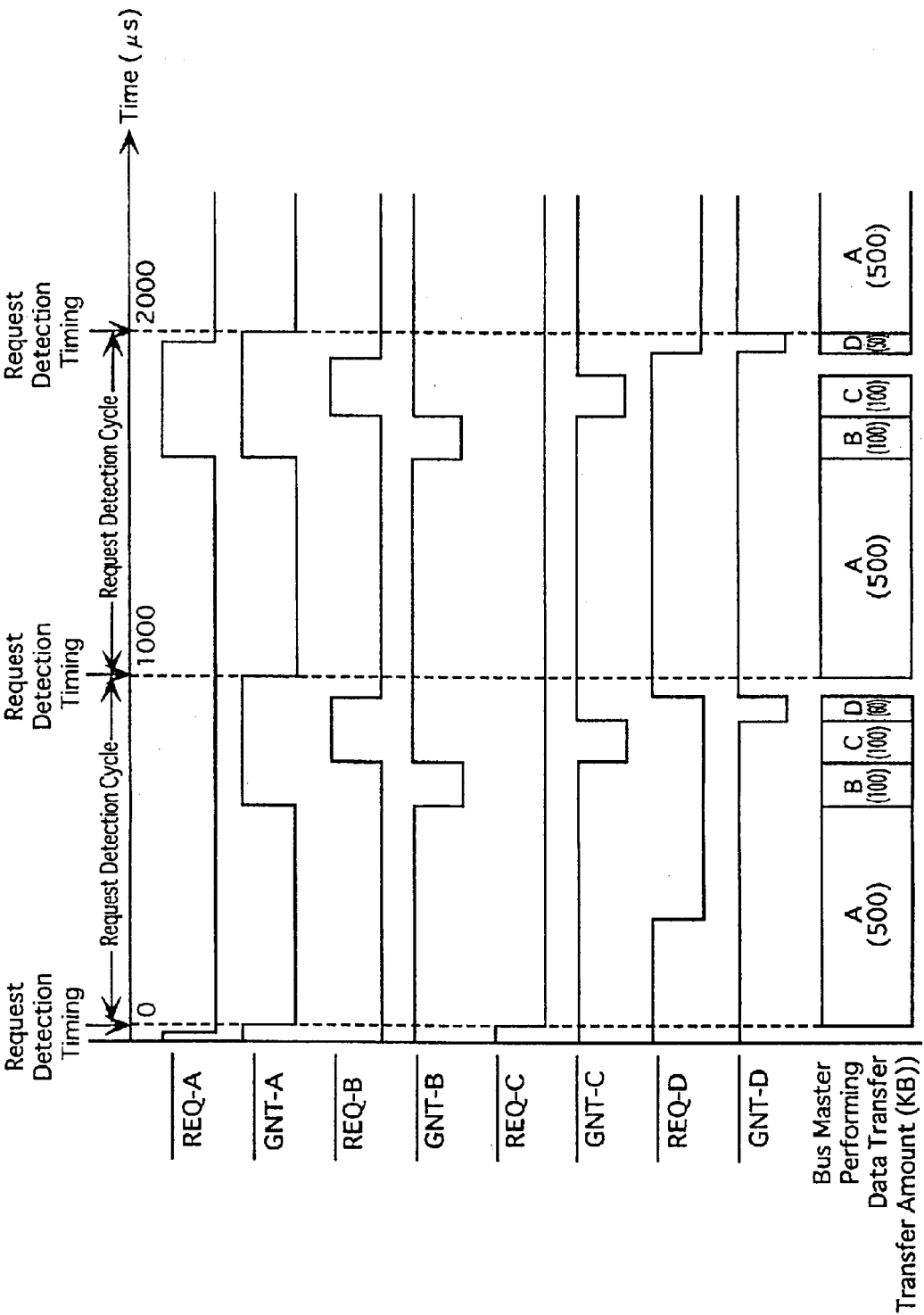
FIG. 9 is a timing chart showing changes with time in bus requests from the bus masters A–D, and the bus use right granted by the memory control unit 510.

FIG. 9 is a timing chart showing changes with time in bus requests from the bus masters A–D and the bus use right granted by the memory control unit 510.

As shown in the figure, the arbiter unit 514 grants the bus use right, within the time period remaining in each request detection cycle after granting the bus use right to the regular type bus masters A–C, to the bus irregular type master provided that the irregular bus master has issued a bus request.

Note that when the bus master D is granted the bus use right within one request detection cycle starting from the immediately preceding request detection timing, and when next request timing has come before the bus master D terminates issuing a bus request, the bus use right granted to the bus master D is terminated. Further, when there is a regular type bus master that has issued no bus request at the time of bus request timing, the time period within which irregular type bus masters may be granted the bus use right becomes longer.

<Modification Examples of Arbitrating Process>

Hereinafter, description is given to a modification example of the above-described arbitrating process performed by the arbiter unit 514. According to this modification, an irregular type bus master is granted the bus use right at an earlier stage.

Figure 10:
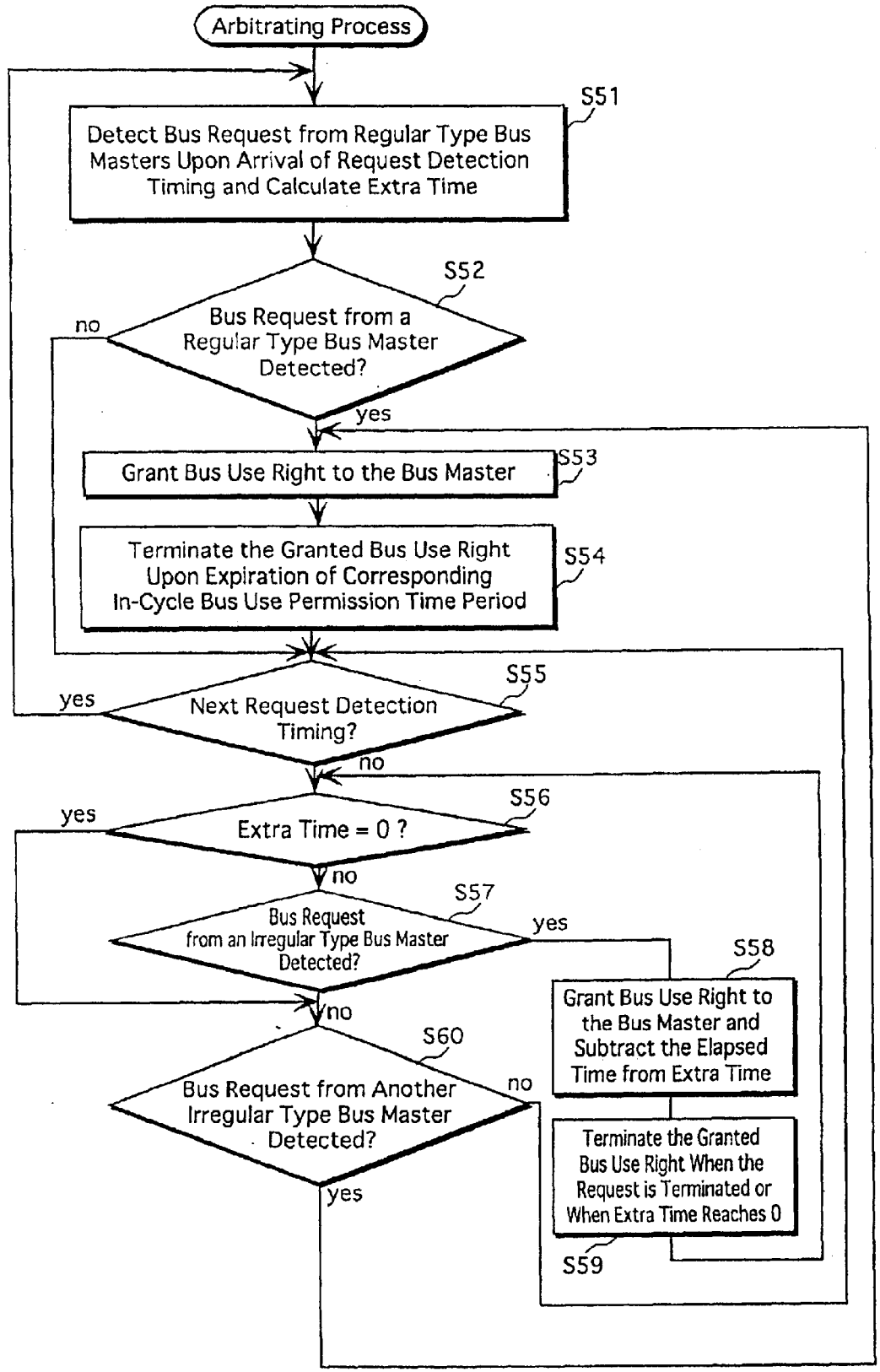
FIG. 10 is a flowchart showing a modification example of the arbitrating process that the arbiter unit 514 performs.

FIG. 10 is a flowchart showing a modification example of the arbitrating process that the arbiter unit 514 performs.

First, at the time when the request detection timing comes, the arbiter unit 514 checks whether a bus request is issued from any of the regular type bus masters, and calculates the total amount of all the in-cycle bus use permission time periods corresponding to the bus masters that issued the detected bus requests. The arbiter unit 514 then subtracts the total amount from the request detection cycle so as to obtain an extra time (step S51). Here, the extra time is a time period within a request detection cycle in which the bus use right may be granted to an irregular type bus masters.

Then, the arbiter unit 514 judges whether a bus request from any of the regular type bus masters has been detected at the time of the checking in the step S31 (step S52).

When the judgment in the step S52 results in that such a bus request has been detected, the arbiter unit 514 grants the bus use right to one of the regular type bus masters that issued a bus request (step S53). The arbiter unit 514 then counts clock signals in order to terminate the grant of the bus use right upon expiration of the in-cycle bus use permission time period corresponding to the bus master (step S54). That is, in the steps S53 and S54, the GNT signal line of one of the regular type bus masters is put into an activate state for the duration of the in-cycle bus use permission time period, and then put back into an inactive state.

Further, when judging in the step S52 that no bus request has been detected, the arbiter unit 514 skips the processes in the steps S53 and S54, and performs the judgment process in the step S55.

Following the step S54, the arbiter unit 514 judges whether the next detection timing has come (step S55). When judging that the next request detection timing has come, the arbiter unit 514 goes back to the process in the step S51, and otherwise judges whether the extra time is equal to zero (step S56).

When the judgment in the step S56 results in that the extra time is not equal to zero, meaning that there is the extra time left, the arbiter unit 514 checks whether there is a bus request issued from the irregular type bus master D (step S57). When detecting such a bus request, the arbiter unit 514 grants the bus use right to the irregular type bus master D and counts down the extra time during the time the bus use right is being granted (step S58). When the bus request from the irregular type bus master is terminated, or when the extra time reaches zero, the arbiter unit 514 terminates the granted bus use right (step S59), and again goes back to the judgment process in the step S56.

Note that the extra time determined in the step S51 is counted down by an amount corresponding to the time period during which the bus use right is granted to the irregular type bus master in the step S58. Yet, the countdown of the extra time is stopped when the extra time reaches zero.

When judging in the step S56 that the extra time is equal to zero, or when detecting in the step S57 no bus request from any of the irregular type bus master, the arbiter unit 514 judges whether there has been detected in the step S51 another bus request from a regular type bus master other than the one that has already granted the bus use right (step S60). When no such request has been detected, the arbiter unit 514 goes back to the process in the step S55, and otherwise goes back to the process in the step S53.

Further, when the judgment in the step S55 results in that the next request detection timing has come, the arbiter unit 514 goes back to the process in the step S51 for checking a bus request from any of the regular type bus masters.

Through the arbitrating process modified as above, in case an irregular type bus master issues a bus request issued during the time a regular type bus master is performing data transfer, the arbiter unit 514 grants the bus use right to that irregular type bus master as soon as terminating the bus use right granted to the regular type bus master due to the expiration of the in-cycle bus use permission time period. It means that irregular type bus masters are allowed to start data transfer promptly after the need for data transfer arises. In other words, through the arbitrating process modified as above, the arbiter unit manages to reduce the access latency for irregular type bus masters to access memory.

Figure 11:
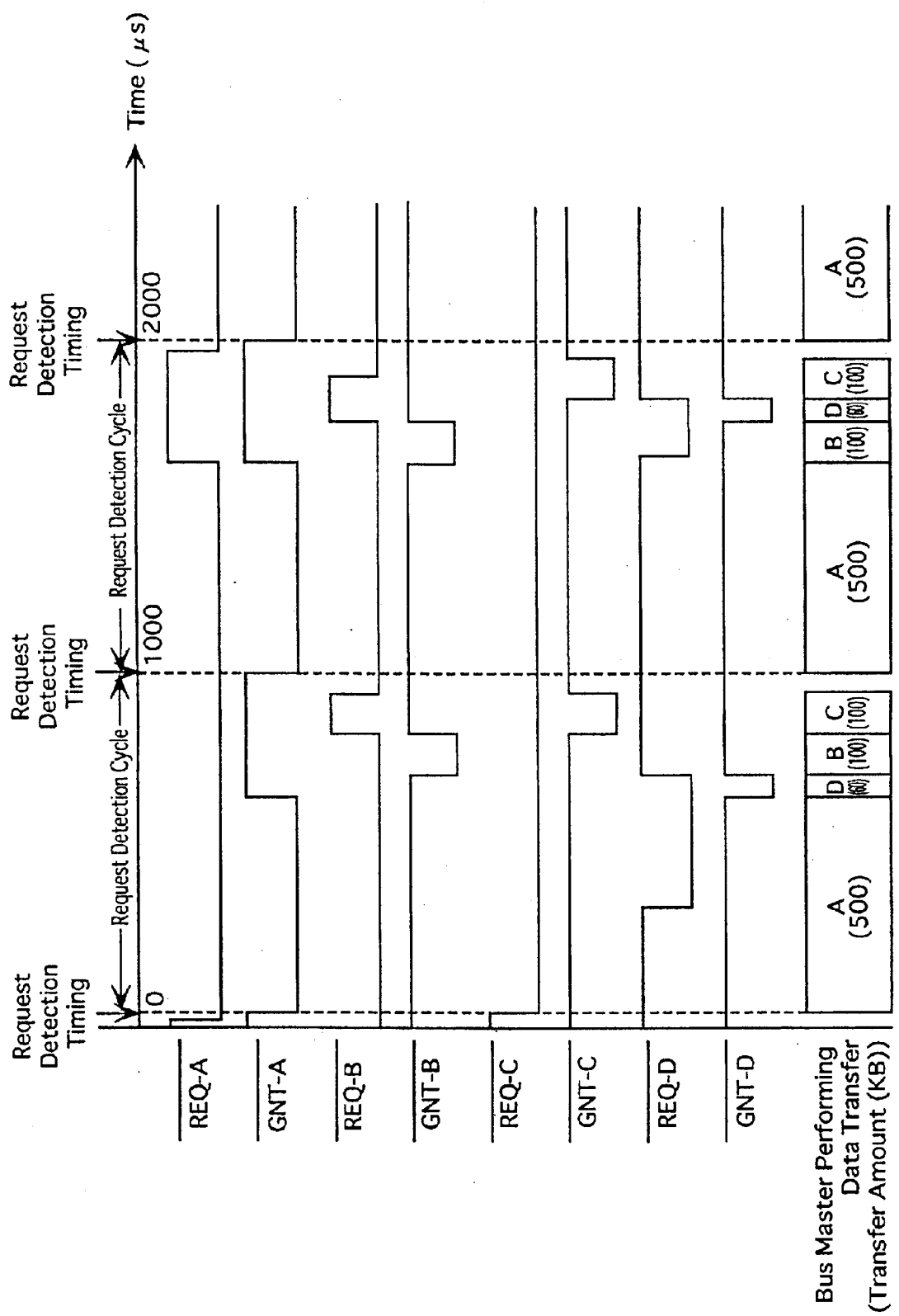
FIG. 11 is a timing chart showing changes with time in bus requests issued from the bus masters A–D, and the bus use right granted by the memory control unit 510 under the condition where the arbiter unit 514 performs the modified arbitrating process.

FIG. 11 is a timing chart showing changes with time in bus requests issued from the bus masters A–D, and the bus use right granted by the memory control unit 510.

As shown in the figure, when a bus request is issued from the irregular type bus master D during the time the regular type bus master A is being granted the bus use right, the arbiter unit 514 grants the bus use right to the bus master D following the bus master A, and then to the regular type bus masters B and D sequentially. In the next request detection cycle, the arbiter unit 514 grants the bus use right to the regular type bus masters A and B, sequentially. When a bus request is issued from the irregular type bus master D during the time the bus master B is being granted the bus use right, the arbiter unit 514 grants the bus use right to the bus master D following the bus master B, and then grants the bus use right to the regular type bus master C.

<Supplement>

Up to this point, description is given to the memory control devices consistent with the present invention by way of the embodiments 1 and 2. Yet, it goes without saying that the present invention is not limited to those specific embodiments. To be more specific:

(1) There may be any number of bus masters employed in the two embodiments as long as there are a plurality of them. Further, the number of irregular type bus masters is not limited to one and any number of irregular type bus masters may be employed. Yet, it is necessary that the LSI be supplied with input of the transfer rate information regarding all the regular type bus masters indicating the transfer rate and the time interval within which the transfer rate should be maintained. Further, when one or more irregular type bus masters are employed, it is necessary that the irregular master information storage unit 515 store irregular master information that is used to identify all the irregular type bus masters.

Note that the LSI may be connected to a plurality of unified memories. In this case, the memory control unit may be constructed to arbitrate access contention separately for each unified memory just in a manner shown in the embodiment 1 or 2.

(2) The memory control unit 110 shown in the embodiment 1 and the memory control unit 510 shown in the embodiment 2 may be constructed totally as a hardware circuit, or alternatively, constituted of an MPU and a memory so as to implement the arbitrating function by the MPU executing a program stored in the memory.

(3) In both the embodiments above, the transfer rate information is composed of pairs of information items, one regarding request cycle and the other regarding the amount of data per transfer. Yet, the transfer rate information may be composed of any combination of information items as long as the transfer rate information indicates the transfer rate and the minimum time interval within which the transfer rate should be maintained.

(4) The transfer rate information described in both the embodiments is inputted from an external device. Yet, their initial values may be preliminarily stored.

Further, the transfer information may be inputted at any time. Every time the transfer information is inputted, the timing information storage unit 112 may generate timing information based on the newly inputted transfer rate information and store the thus generated timing information to the timing information storage unit 113. Since the arbiter unit 114 and the arbiter unit 514 determine a time period for granting the bus use right based on the timing information, dynamic arbitrating control is thus realized.

Note that in the embodiment 2, the bus masters are classified into a regular type and an irregular type. This classification is based on whether a fixed transfer rate is required for each bus master at the time of performing data transfer. Consequently, depending on the transfer rate information inputted from an external source to the LSI, the same bus master may be a regular type in some cases and irregular type in some other cases.

(5) Both the embodiments describe the bus bandwidth of the memory bus that the timing information generation unit 112 refers to. It is applicable to make an arrangement such that this bus bandwidth may be inputted from an external source to the LSI.

(6) The memory control unit 110 described in the embodiment 1 and the memory control unit 510 described in the embodiment 2 may be constructed to give each bus master information, such as request detection cycle, for specifying request detection timing. Here, each bus master may be constructed to receive the information and issue a bus request in accordance with the specified request detection timing.

(7) In both the embodiments, the bus use right is granted to a bus master by putting the GNT signal line into active state, and the granted bus use right is terminated by putting the GNT signal line into an inactive state. Yet, the present invention is not limited to these specific manners, and granting and terminating the bus use right may be realized in any manner as long as permission and prohibition for the bus use is given to each bus master.

For example, it may be applicable to notify a bus master of grant of the bus use right through momentary activation of one signal line, and of termination of the bus use right through momentary activation of another signal line.

Further, in both the embodiments, each regular type bus master is described to continually keep the REQ signal line in an active state as long as data transfer needs to be performed. Yet, issuing of a bus request is not limited to this manner. For example, based on the transfer rate information, the memory control unit 110 and the memory control unit 510 may notify each bus master of the data amount that may be transferred within one request detection cycle. Here, each bus master may momentary activate the REQ signal line when wanting to transfer the notified amount of data.

(8) The unified memory 200 described in both the embodiments are not limited to a memory having a specific memory architecture, and any memory may be applicable.

Further, each memory bus connecting each bus mater and the unified memory may be constructed of separate signal lines of an address bus and data bus, or of one common signal line. When each bus master is constructed of one common signal line, address information and data are transferred between the bus master and the unified memory by way of time sharing. Further, the bus connecting the bus master and the unified memory may be connected via an interface unit included in the memory control unit so that processing such as address decoding may be performed by the interface unit.

(9) In the case of the LSI described in each embodiment, each bus master basically accesses separate memory areas within one unified memory. Yet, each bus master may access a memory area that is commonly accessed by a different bus master.

(10) In the embodiment 2, the timing information generator unit 112 determines the shortest request cycle among the request cycles the regular type bus masters based on the transfer rate information, and the bus use right is granted at every request detection cycle to each regular type bus master that issues a bus request. This request detection cycle may be equal to, or shorter than the shortest request cycle among the request cycles of regular type bus masters.

For example, a half of the shortest request cycle among the request cycles of all the regular type bus masters may be determined as the request detection cycle. The shorter request detection cycle requires shorter time for the memory control device to grant the bus use right to an irregular type bus master after receiving a bus request from the bus master.

Note that it may be applicable to make an arrangement to allow external input of information as to what proportion of the shortest request cycle among the request cycles of all the regular type bus masters is to be determined as the request detection time. Here, the request detection time may be determined according to the information.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A memory control device for arbitrating memory access contention among a plurality of bus masters sharing a memory by selectively granting a bus use right that permits the usage of a memory bus to one of the plurality of bus masters at a time, the memory control device comprising:

holding means for holding transfer rate information regarding each of the plurality of the bus masters, the transfer rate information indicating (i) a transfer rate at which a corresponding bus master performs data transfer to or from the memory, and (ii) an ensuring time period within which data transfer at the transfer rate is to be ensured;

reference period calculating means for determining, as a reference time period, a time period equal to or shorter than a shortest ensuring time period among all the ensuring time periods;

bus use permission time period calculating means for calculating bus use permission time periods, each of which is a time period that a bus master takes to transfer an amount of data V using a bus bandwidth of the memory bus, wherein V represents an amount of data that a corresponding bus master is capable of transferring at a corresponding transfer rate within the reference time period; and use right granting means for granting the bus use right to each bus master for a corresponding bus use permission time period within each reference time period that repeats cyclically.

2. The memory control device of claim 1, comprising detecting means for detecting a bus request from each bus master, wherein the use right granting means grants the bus use right for a current reference time period to each bus master of which a bus request has been detected by the detecting means prior to a start of the current reference time period.

3. The memory control device of claim 2, wherein the bus masters are classified into (i) regular type bus masters, each of which is required to perform data transfer to or from the memory at a fixed transfer rate, and (ii) irregular type bus masters, which are bus masters other than the regular type bus masters, the holding means holds the transfer rate information regarding each regular type bus master, the bus use permission time period calculating means calculates the bus use permission time periods for each regular type bus master, and the use right granting means grants the bus use right for each reference time period (i) to each regular type bus master of which a bus request has been detected prior to a start of the current reference time period, the bus use right being granted for a corresponding bus use permission time period, and (ii) to each irregular type bus master for, at the maximum, a time period remaining after subtracting from the reference time period a total amount of the bus use permission time periods calculated for each of the regular type bus masters of which bus requests have been detected.

4. The memory control device of claim 3, wherein the use right granting means grants the bus use right for each reference time period to an irregular type bus master immediately after terminating the bus use right granted to a regular type bus master when the detecting means detects a bus request from the irregular type bus master during the time the bus use right is being granted to the regular type bus master.

5. The memory control device of claim 4, wherein the holding means acquires the transfer rate information from a source external to the memory control device, and holds the acquired transfer rate information.

6. The memory control device of claim 4, wherein the holding means holds the transfer rate information within the memory control device in a memory area that is rewritable by an external device.

7. The memory control device of claim 4, wherein the memory control device is connected to each bus master through a signal line used for granting the bus use right, and the use right granting means grants the bus use right to each bus master by putting a signal line connected to the bus master into an active state for a corresponding bus use permission time period.

8. The memory control device of claim 1, wherein the reference time period calculating means determines, as the reference time period, the shortest ensuring time period among all the ensuring time periods.

9. The memory control device of claim 1, wherein the holding means acquires the transfer rate information from a source external to the memory control device, and holds the acquired transfer rate information.

10. A memory control device for arbitrating memory access contention among a plurality of bus masters accessing separate memory areas within a memory by selectively granting a bus use right that permits the usage of a memory bus to one of the plurality of bus masters at a time, the memory control device comprising:

holding means for holding transfer rate information regarding each of the plurality of the bus masters, the transfer rate information indicating (i) a transfer rate at which a corresponding bus master performs data transfer to or from the memory, and (ii) an ensuring time period within which data transfer at the transfer rate is to be ensured;

reference period calculating means for determining, as a reference time period, a time period equal to or shorter than a shortest ensuring time period among all the ensuring time periods;

bus use permission time period calculating means for calculating bus use permission time periods, each of which is a time period that a bus master takes to transfer an amount of data V using a bus bandwidth of the memory bus, wherein V represents an amount of data that a corresponding bus master is capable of transferring at a corresponding transfer rate within the reference time period; and use right granting means for granting the bus use right to each bus master for a corresponding bus use permission time period within each reference time period that repeats cyclically.

11. The memory control device of claim 10, wherein detecting means for detecting a bus request from each bus master, wherein the use right granting means grants the bus use right for a current reference time period to each bus master of which a bus request has been detected by the detecting means prior to a start of the current reference time period.

12. The memory control device of claim 11, wherein the bus masters are classified into (i) regular type bus masters, each of which is required to perform data transfer to or from the memory at a fixed transfer rate, and (ii) irregular type bus masters, which are bus masters other than the regular type bus masters, the holding means holds the transfer rate information regarding each regular type bus master, the bus use permission time period calculating means calculates the bus use permission time periods for each regular type bus master, and the use right granting means grants the bus use right for each reference time period (i) to each regular type bus master of which a bus request has been detected prior to a start of the current reference time period, the bus use right being granted for a corresponding bus use permission time period, and (ii) to each irregular type bus master for, at the maximum, a time period remaining after subtracting from the reference time period a total amount of the bus use permission time periods calculated for each of the regular type bus masters of which bus requests have been detected.

13. The memory control device of claim 12, wherein the use right granting means grants the bus use right for each reference time period to an irregular type bus master immediately after terminating the bus use right granted to a regular type bus master when the detecting means detects a bus request from the irregular type bus master during the time the bus use right is being granted to the regular type bus master.

14. An LSI including (i) a plurality of circuits that share a memory and (ii) a memory control device for arbitrating memory access contention by selectively granting a bus use right that permits the usage a memory bus to one of the plurality of circuits at a time, each circuit is required to perform data transfer to or from the memory at a fixed transfer rate, the memory control device comprising:

holding means for holding transfer rate information regarding each of the plurality of the circuits, the transfer rate information indicating (i) a transfer rate at which a corresponding circuit performs data transfer to or from the memory, and (ii) an ensuring time period within which data transfer at the transfer rate is to be ensured;

reference period calculating means for determining, as a reference time period, a time period equal to or shorter than a shortest ensuring time period among all the ensuring time periods;

bus use permission time period calculating means for calculating bus use permission time periods, each of which is a time period that a circuit takes to transfer an amount of data V using a bus bandwidth of the memory bus, wherein V represents an amount of data that a corresponding circuit is capable of transferring at a corresponding transfer rate within the reference time period; and use right granting means for granting the bus use right to each circuit for a corresponding bus use permission time period within each reference time period that repeats cyclically.

15. The LSI of claim 14, wherein each circuit performs data transfer to or from one of separate memory areas within the memory.

16. The LSI of claim 14, wherein the memory control device comprises detecting means for detecting a bus request from each circuit, wherein the use right granting means grants the bus use right for a current reference time period to each circuit of which a bus request has been detected by the detecting means prior to a start of the current reference time period.

17. The LSI of claim 16, wherein the circuits are classified into (i) regular type bus masters, each of which is required to perform data transfer to or from the memory at a fixed transfer rate, and (ii) irregular type bus masters, which are circuits other than the regular type bus masters, the holding means holds the transfer rate information regarding each regular type bus master, the bus use permission time period calculating means calculates the bus use permission time periods for each regular type bus master, and the use right granting means grants the bus use right for each reference time period (i) to each regular type bus master of which a bus request has been detected prior to a start of the current reference time period, the bus use right being granted for a corresponding bus use permission time period, and (ii) to each irregular type bus master for, at the maximum, a time period remaining after subtracting from the reference time period a total amount of the bus use permission time periods calculated for each of the regular type bus masters of which bus requests have been detected.

18. The LSI of claim 17, wherein the use right granting means grants the bus use right for each reference time period to an irregular type bus master immediately after terminating the bus use right granted to a regular type bus master when the detecting means detects a bus request from the irregular type bus master during the time the bus use right is being granted to the regular type bus master.

19. The LSI of claim 14, wherein the holding means acquires the transfer rate information from a source external to the memory control device, and holds the acquired transfer rate information.

* * * * *